United States Patent
Culberson et al.

(10) Patent No.: US 6,224,381 B1
(45) Date of Patent: May 1, 2001

(54) EDUCATING SPECIAL NEEDS CHILDREN ABOUT MONEY

(75) Inventors: Judith L. Culberson; Dean A. Caldwell, both of Winston-Salem; Christie Lockhart, Fayetteville, all of NC (US)

(73) Assignee: Kaplan Companies, Inc., Lewisville, NC (US)

( * ) Notice: Subject to any disclaimer, the term of this patent is extended or adjusted under 35 U.S.C. 154(b) by 0 days.

(21) Appl. No.: 09/267,485

(22) Filed: Mar. 11, 1999

(51) Int. Cl.[7] ................................... G09B 19/18
(52) U.S. Cl. .............................. 434/110; 434/107
(58) Field of Search ..................... 434/107, 110, 434/128, 129, 403, 408; 446/129, 139

(56) References Cited

U.S. PATENT DOCUMENTS

| | | | |
|---|---|---|---|
| 3,488,864 | * 1/1970 | Mcmanus | 434/107 |
| 3,579,862 | 5/1971 | Ballen | 35/8 |
| 3,674,264 | 7/1972 | Boercker | 273/1 R |
| 3,690,017 | 9/1972 | Holmquist | 35/24 R |
| 3,744,150 | 7/1973 | Folson | 35/8 A |
| 3,775,775 | 12/1973 | Mazzenga | 2/80 |
| 3,878,638 | 4/1975 | Benjamin | 46/1 L |
| 4,168,583 | 9/1979 | Halpern | 35/31 D |
| 4,253,197 | 3/1981 | Posta | 2/69 |
| 4,478,583 | 10/1984 | Sellers | 434/259 |
| 4,530,349 | 7/1985 | Metzger | 128/1 R |
| 4,571,189 | * 2/1986 | Shank | 434/107 |
| 4,604,062 | 8/1986 | Woods | 434/88 |
| 4,775,321 | 10/1988 | Comeaux et al. | 434/110 |
| 4,934,939 | 6/1990 | Bonneville | 434/247 |
| 5,066,234 | 11/1991 | LeDesma | 434/205 |
| 5,145,377 | 9/1992 | Tarvin et al. | 434/219 |
| 5,282,740 | 2/1994 | Okayasu | 431/344 |
| 5,282,749 | 2/1994 | Ketch | 434/395 |
| 5,312,257 | 5/1994 | Tarvin et al. | 434/219 |
| 5,318,447 | * 6/1994 | Mooney | 434/107 |
| 5,429,373 | * 7/1995 | Chelko et al. | 434/107 |
| 5,435,728 | 7/1995 | Fula et al. | 434/258 |
| 5,538,432 | 7/1996 | Dondero et al. | 434/258 |
| 5,626,477 | 5/1997 | Adkison | 434/128 |
| 5,799,942 | 9/1998 | Birt | 273/256 |

OTHER PUBLICATIONS

Exerpt from "A Special Picture Cook Book"; undated—believed to be prior art.
Delta Education catalog, p. 7; Spring 1999.

* cited by examiner

Primary Examiner—Sam Rimell
(74) Attorney, Agent, or Firm—Charles W. Calkins; Kilpatrick Stockton LLP

(57) ABSTRACT

An apparatus for educating special needs children about money includes a easel having a display page having ferromagnetic properties arranged to display the display page to a child and specimen money and a plurality of graphics cards having magnetic properties adapted for mounting on the display page. The graphics cards include a first money card having numeric depictions stating values of money so the child can place corresponding money on the display page in association with the numeric depictions, a second money card having depictions of various ones of the money so that the child can place several items of money on the graphics card of lesser value than the depicted money to arrive at the value of the depicted money, and a third money card having numeric depictions stating various values, so that the child can place several items of money of lesser value than the numeric depiction to arrive at the value of the numeric depiction. Also, budget cards with budget category identifiers and an amount for the budget category are included, so that the child can place money on the display page for the amount for the budget category.

22 Claims, 3 Drawing Sheets

EDUCATING SPECIAL NEEDS CHILDREN ABOUT MONEY

BACKGROUND OF THE INVENTION

The present invention relates to methods and apparatus for teaching special needs children about money, its value, and budgeting. It provides a product designed for two primary categories of children with special needs. The first category is Educable Mentally Handicapped (EMH) children, who are able to be taught in a classroom setting and have the potential to progress into a vocational-tech career path. The second category is Trainable Mentally Handicapped (TMH) children, who have the abilities to understand and use what they have learned, but on a limited basis. Both groups of children, if properly taught, have the possibility of moving into Independent Living Environments.

Until recently, the needs of such children have not been adequately addressed. One particularly critical, unaddressed skill for independent living is the ability to recognize and use money.

The product may also benefit individuals with motor or cognitive difficulties that are not necessarily categorized as mentally handicapped. For instance, the items could be used by adults who need special assistance with fine motor skills, including individuals who suffer from strokes or other impairments that require some type of therapeutic intervention.

An effective training system teaches an important and useful skill that is fun for the student. The system should be designed to the level of the learning ability of the student because one that is too complicated will frustrate and cause confusion. This is especially important when training persons with learning disabilities and also those having short attention spans who may become easily frustrated. Many of the currently available training systems for teaching a student about money are geared to skill levels above persons in these groups.

Existing training tools are often complicated. Even after a student has been instructed on how to perform the lesson, they may still be apprehensive and uncertain when required to perform the lesson independently. These types of training systems are often not enjoyed by the students resulting in their reluctance or refusal to use them.

Therefore, there is a need for a system of training students how to recognize money and develop rudiments of budgeting that uses intuitive and relaxed methods that students can understand and use independently after a minimal amount of instruction.

SUMMARY OF THE INVENTION

The present invention fulfills this need in the art by providing an apparatus to educate special needs children about money including an easel arranged to display a display page to a child, a graphics card mountable on the display page and having money information visible thereon, and specimen money adapted for mounting on the graphics card and display page in an arrangement correlated with the money information visible on the graphics card.

In one embodiment the display page includes top and bottom edges, and the easel includes a frame hinged to the top edge of the display page and a base hinged to the bottom edge. The frame and base have engagement points spaced from their respective hinges to the display page to interlock the frame and base to form the easel into a triangular form to position the display page for display to the child. The engagement points may include a bar on the frame and notches on the base, so that the bar can engage selected ones of the notches for selectively setting a vertical angle of display of the easel to the child.

Preferably, the display page has ferromagnetic properties and the graphics card and specimen money have magnetic properties so that the graphics card and specimen money will be supported by magnetic attraction to the display page.

In one embodiment, the graphics card includes numeric depictions stating values of various ones of the specimen money, so that the child can place corresponding specimen money on the graphics card in association with the numeric depictions to learn to match the appearance of the specimen money with the numeric amount depicted.

In another embodiment, the graphics card includes depictions of various ones of the specimen money. This permits the child to place several items of specimen money on the graphics card of lesser value than the depicted money to arrive at the value of the depicted specimen money to learn to equate the value of several items of the lesser value money with the depicted money. The depictions may include depictions of a one dollar bill, two quarters, one dime and one nickel.

In another embodiment, the depictions include numeric depictions stating values of twenty dollars, ten dollars, and five dollars. This permits the child to place specimen money on the graphics card corresponding to the numeric depictions and several items of specimen money of lesser value than the numeric depiction to arrive at the value of the numeric depiction to learn to equate the value of several items of the lesser value money with the depicted money.

In another embodiment, the graphics card includes a first card with a budget category identifier and a second card for an amount for the budget category. With this embodiment, the child can place specimen money on the display page corresponding to the amount for the budget category to learn to equate the value of the money placed on the display page with the amount needed for the budget category.

The graphics card may include a budget category name card with the budget category identified in letters and a budget category illustration card that shows a non-alphanumeric illustration of the budget category. Putting these items on separate cards gives the child the opportunity to place corresponding first and second cards together on the display page to learn to identify the name of the budget category with the type of benefit obtained by spending money in that category. Preferably, the budget categories and non-alphanumeric displays are as follows:

| Budget Category | Non-alphanumeric Illustration |
|---|---|
| rent | a picture of a dwelling place |
| groceries | a picture of a grocery bag |
| medical | a picture of a pill bottle |
| transportation | a picture of a bus |
| clothing | a picture of a jacket |
| utilities | a picture of a light switch, faucet and thermostat |

Other budget categories can be substituted or added.

In a preferred embodiment, the second card for an amount is blank and receptive to temporary marking with an amount to be used as a budget amount for an exercise and changeable to a different amount for a different exercise.

The specimen money may include simulations of $1.00 bills, $5.00 bills, $10.00 bills, $20.00 bills, $50.00 bills, $100.00 bills, quarters, dimes, nickels, and pennies.

In a most preferred embodiment, the apparatus includes a full collection of all of the above-mentioned graphics cards, so that the child can be given a variety of educational experiences.

The invention also provides a method of educating special needs children about money including arranging a display page to be within reach of a child, mounting a graphics card on the display page having money information visible thereon, and providing the child with specimen money adapted for mounting on the display page in an arrangement correlated with the money information visible on the graphics card.

Mounting may include supporting the graphics card on the display page by magnetic attraction to the display page.

Mounting may also include mounting a graphics card that includes numeric depictions stating values of various ones of the specimen money. The method may include asking the child to place corresponding specimen money on the graphics card in association with the numeric depictions. This gives the child the opportunity to learn to match the appearance of the specimen money with the numeric amount depicted.

Alternatively, mounting may include mounting a graphics card that includes depictions of various ones of the specimen money, and the method may include asking the child to place items of specimen money on the graphics card of lesser value than the depicted money to arrive at the value of the depicted specimen money. This gives the child the opportunity to learn to equate the value of several items of the lesser value money with the depicted money. The method may also include asking the child to place items of money on the graphics card to arrive at the value of a one dollar bill, two quarters, one dime and one nickel.

In addition, mounting may include mounting a graphics card that includes numeric depictions stating values of twenty dollars, ten dollars, and five dollars, and the method may include asking the child to place specimen money on the graphics card corresponding to the numeric depictions and also to place items of specimen money of lesser value than the numeric depiction to arrive at the value of the numeric depiction. This gives the child the opportunity to learn to equate the value of several items of the lesser value money with the depicted money.

Furthermore, mounting may include mounting a first card with a budget category identifier and a second card for an amount for the budget category, and the method may include asking the child to place specimen money on the display page corresponding to the amount for the budget category. This gives the child the opportunity to learn to equate the value of the money placed on the display page with the amount needed for the budget category. Mounting the second card may include writing an amount with a temporary marking on the second card as an amount to be used as a budget amount for an exercise, and the method may include removing the temporary marking after completion of the exercise.

Mounting may also include mounting a card that includes a budget category name card with the budget category identified in letters and a budget category illustration card that shows a non-alphanumeric illustration of the budget category, and the method may include asking the child to place corresponding first and second cards together on the display page. This gives the child the opportunity to learn to identify the name of the budget category with the type of benefit obtained by spending money in that category. The budget categories and non-alphanumeric illustrations are preferably as above.

The apparatus may also include a carton for containing the easel, graphics card and specimen money, the carton having a closeable and lockable lid.

DESCRIPTION OF THE PREFERRED EMBODIMENTS

Figure 1:
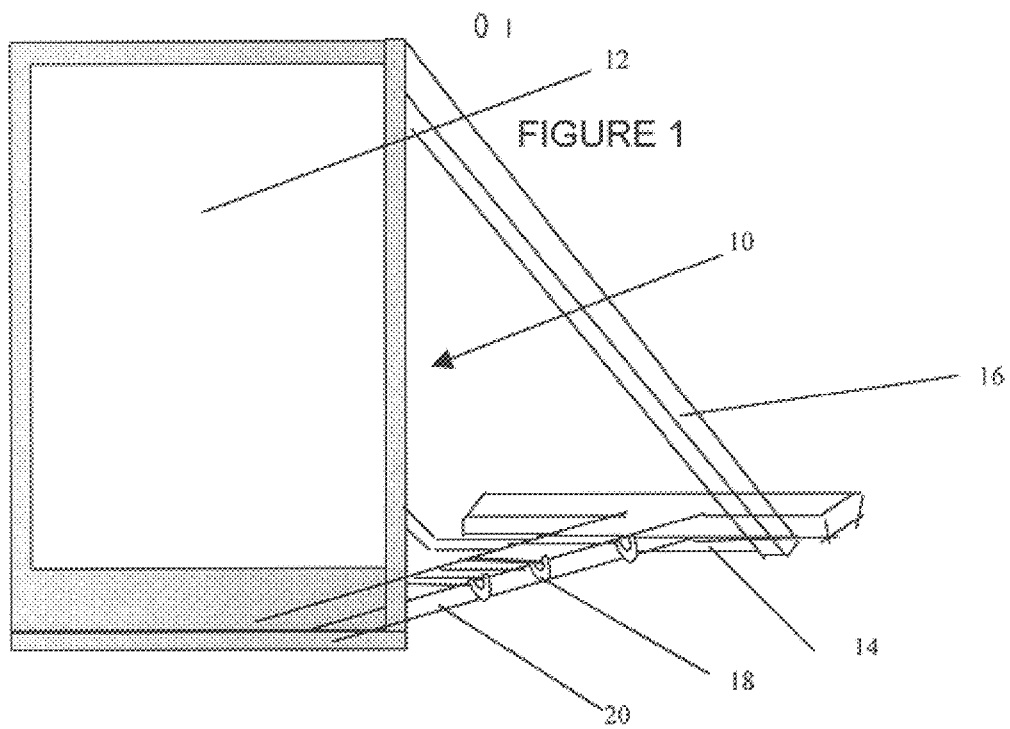
FIG. 1 is an elevational view of a easel in accordance with a preferred embodiment of the invention.

Referring now to FIG. 1, there is shown a display apparatus or easel 10 useful in a preferred embodiment of the invention. The easel 10 includes a display page 12, base 20 and frame 16. The frame 16 is hinged to a top edge of the display page 12 and the base 20 is hinged to a bottom edge. The frame 16 includes a crossbar 14 which is selectively engageable in notches 18 in the base 20. Thus, when the base 20 is placed on the table, the angle to the vertical of the display page 12 is selectable, depending upon which notch 18 the bar 14 engages. When the bar 14 is not engaged with the notches 18, the base and frame can be folded toward the page 12 to make a compact unit for storage.

The display page 12 has a large central area, as shown, and an optional peripheral framing area. Preferably, the display page 12 is metallic or some other material having ferromagnetic properties to which a magnet would be attracted.

Figure 2:
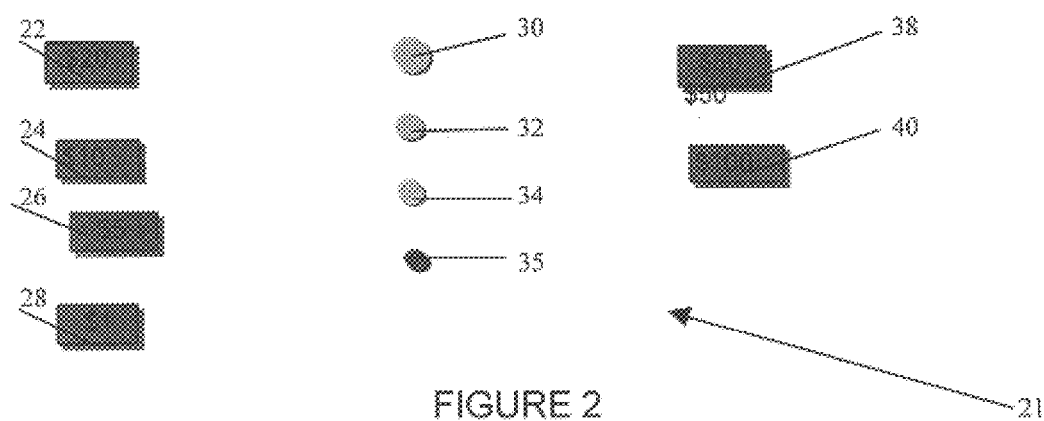
FIG. 2 is a schematic view of specimen money useable in a preferred embodiment of the invention.

As seen in FIG. 2, specimen money 21 is provided in token form. The specimen money 21 includes simulations of paper such as twenty dollar bill 22, ten dollar bill 24, five dollar bill 26, one dollar bill 28, fifty dollar bill 38 and one hundred dollar bill 40. These depictions are preferably as close to real as possible, so that a child working with the specimen money will have a real appreciation for the appearance. In addition, simulated coins such as a quarter 30, nickel 32, dime 34 and penny 35 are provided to be as realistic-looking as possible. All of the items of specimen money 21 are provided with a magnetic backing adhered to it so that, when located adjacent to the display page 12, the specimen money will stay in position on the display page by the magnetic attraction to the metallic display page 12.

Figure 3:
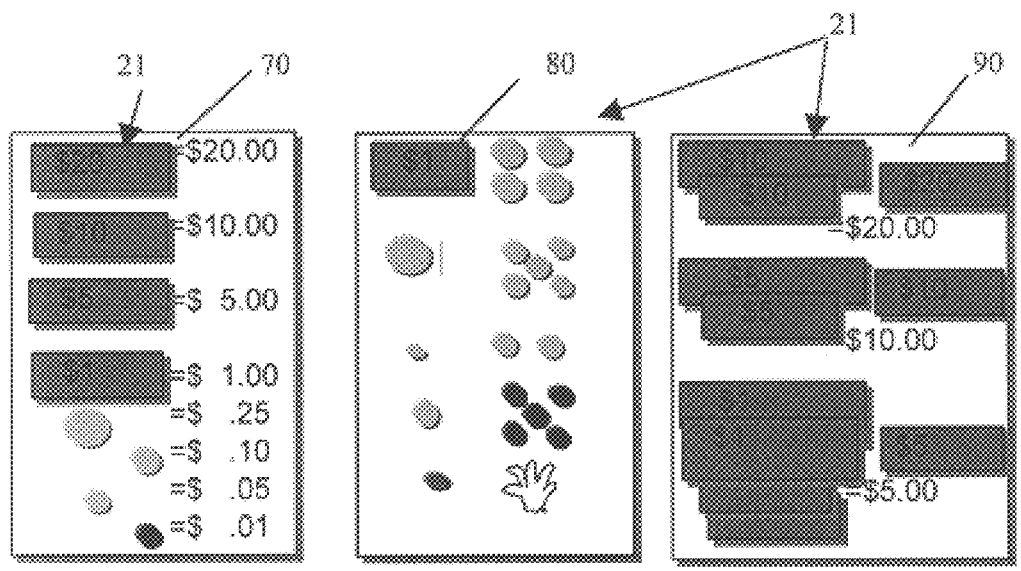

FIG. 3 shows three graphics cards 70, 80 and 90 according to a preferred embodiment of the invention. The graphics cards 70, 80 and 90 are made of a size comparable with the size of the display page 12 of the easel 10. Each graphics card is provided with a magnetic backing so that it will adhere to the display page 12, but also has specimen money 21 adhered to it. The cards are shown in FIG. 3 with selected ones of the specimen money mounted in place. Each display page has different graphics depicted thereon. Graphics card 70 has numeric depictions of money amounts corresponding to various ones of the specimen money depicted in FIG. 2. Thus, as shown in FIG. 3, on the right-hand side of the graphics card 70, phrases such as "=$20.00" are adjacent a space to the left on which an item of specimen money 21 can be provided as equal to the stated numeric depiction. Thus, as seen, the child can learn that a twenty dollar bill 22 has a value equal to a twenty dollar numeric depiction. The other specimen money, ten dollars, five dollars, one dollar, twenty-five cents, ten cents, five cents and one cent, can similarly be mounted on the graphics card 70 in opposition to the numeric depiction for the corresponding amount of money.

In use, the child is provided with the specimen money and the card 70 is mounted on the page 12 within the child's reach. The child is then asked to place the specimen money 21 in its proper location on the card 70. In doing this exercise, the child learns to recognize and correlate the amount of money written on the right with the appearance of the specimen money on the left.

Graphics card 80 has ones of the specimen money shown on the left, such as a one dollar bill, two quarters, one dime, one nickel and one penny. After the removal of the graphics card 70 from the display page 12, the graphics card 80 can be put on the display page 12 and the specimen money 21 provided to the child to place on the graphics card 80. This exercise enables the child to learn the way that several smaller value coins can make up the value of the larger value depiction of the money. Thus, as seen in FIG. 3, four quarters at the top of the graphics card 80 are placed in opposition to the one dollar bill. Below that, five dimes are matched with two quarters; two nickels are matched with one dime; and five pennies are matched with one nickel. The lowermost depiction of a penny has no lesser value to match with it, so that a congratulatory hand or other celebratory logo can be placed on the graphics card 80.

Graphics card 90 has certain numeric depictions of dollar values, as seen in FIG. 3. In this embodiment, the values are twenty dollars, ten dollars and five dollars. When this graphics card 90 is loaded onto the display page 12, the child can be asked to place a twenty dollar bill 22 directly above the numeric depiction with two ten dollar bills 24 to the left to indicate recognition that the two ten dollar bills equal the value of one twenty dollar bill. Similarly, a ten dollar bill can be placed above the stated dollar value of ten dollars, with two five dollar bills 26 in association therewith. At the bottom of the graphics card 90, a five dollar bill 26 can be placed above the stated dollar value of five dollars, and five one dollar bills 28 can be placed to the left indicating the equivalence of values. This exercise provides the child with an opportunity to learn that higher value dollar bills can be made up to be equal to multiple ones of lower value bills.

Figure 4:
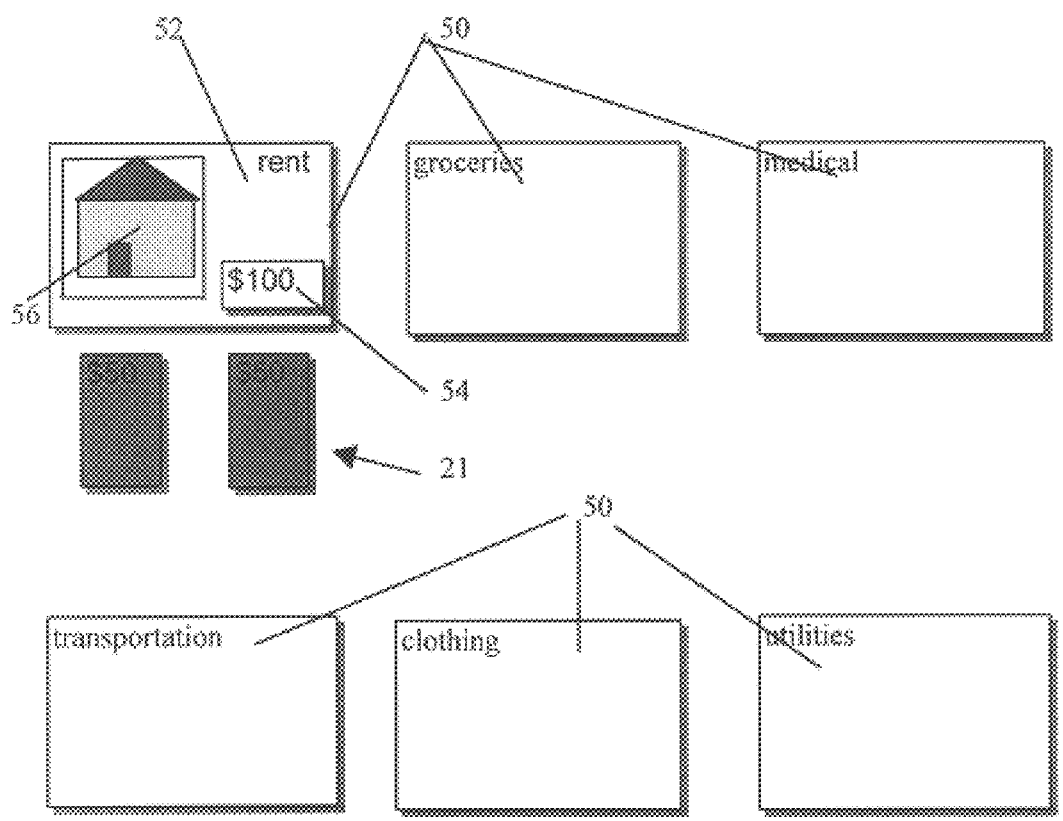
FIGS. 3 and 4 are schematic views of graphics cards useable in a preferred embodiment of the invention.

FIG. 4 shows graphics cards which can be used on display page 12 to teach a child about budgeting. They are provided with similar magnetic backings. For example, a budget category name card 52 having the word "rent" thereon may be mounted onto the display page 12. The child can be encouraged to place a budget category illustration card 56 on the card 52. As seen in FIG. 4, card 56 shows a picture of a house or other dwelling place, indicative of the fact that rent payments provide a person with shelter. An instructor can write a dollar amount on "amount of budget category" card 54, such as seen in FIG. 4 as $100, and mount that on the card 50 or on display page 12. The child can then be asked to place from his/her collection of specimen money 21 the appropriate money to mount onto the display page 12 to pay the amount of the budget category, in this case $100 for rent. Similar exercises can be undertaken with the other budget category name cards 50, shown in FIG. 4, for the various budget categories of groceries, medical, transportation, clothing and utilities. Preferably, the budget category illustration cards for these categories are, respectively, a bag of groceries, a pill bottle, a picture of a bus, a picture of a jacket, and a picture of a light switch, faucet and thermostat. Of course, other non-alphanumeric illustrations or other budget categories can be substituted, if desired.

In the embodiment shown in FIG. 4, the amount of the budget category card 54 is provided in blank, but equipped to be rewritten such as with a dry-erase marker or with a grease pencil that can be wiped off. This provides the possibility of teaching various dollar values to enable the child to learn to make more complicated specimen money combinations. If desired, permanent markings can be provided.

In addition, other means to cause the specimen money and graphics cards to adhere to the display page can be substituted, such as Velcro or other hook-and-loop connectors, or felt boards or electrostatic adherence.

Furthermore, the construction of the easel 10 is not critical, particularly as respect the base and frame, such that any suitable apparatus to provide to the child an easily readable and easily accessible surface for the display page 12 is accomplished. Preferably, however, the easel can be folded into a flat shape for storage.

In use of the apparatus as described, the child has the opportunity to learn the identity of the various items of the specimen money, and learn what they look like in comparison with the numeric descriptions, such as in the graphics card 70. The child can also learn how smaller value items of specimen money make up an equal value to the larger value, using graphics cards 80 and 90, and learn numerous concepts about budgeting. In particular, the child can learn how to recognize the words for the various budget categories and the type of benefit provided to him/her, and can learn how to put together the appropriate items of specimen money to equal the value to be allocated for each budget category.

Figure 5:
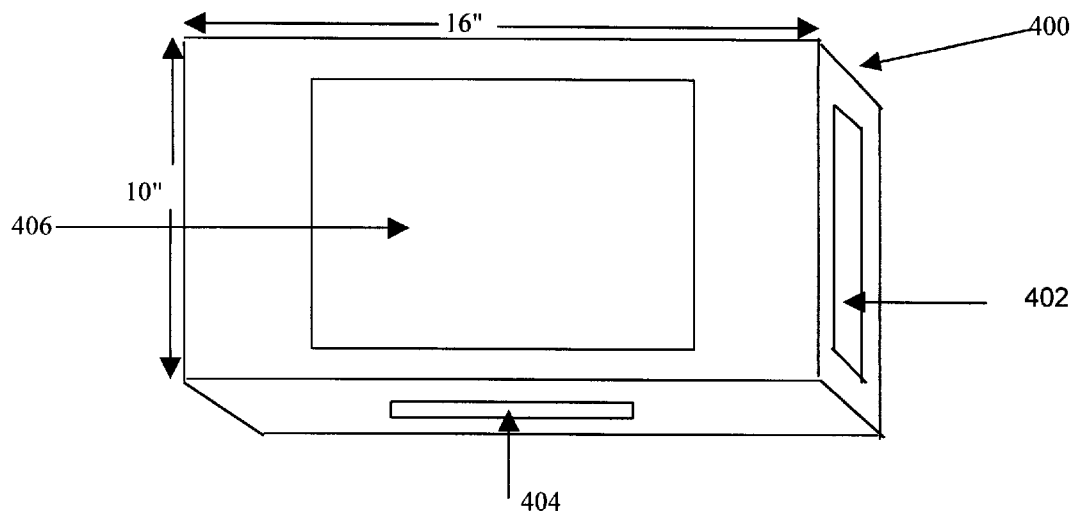
FIG. 5 is a top perspective view of a carton useful in an embodiment of the invention.

Preferably, the easel is sized so that it can be collapsed into a compact arrangement to fit into a carton, such as carton 400 depicted in FIG. 5.

FIG. 5 depicts a carton 400 for holding the easel, graphics card and specimen money so that they may be stored in a classroom for ready accessibility to the teacher.

The carton 400 can be provided with a label 406 indicative of the contents of the carton and a side label 402. The carton is preferably a corrugated cardboard, but other materials can be used. The top label 406 can be adhered to a hinged lid, which can be closed and secured by an interlocking handle 404 in a locked position.

Figure 6:
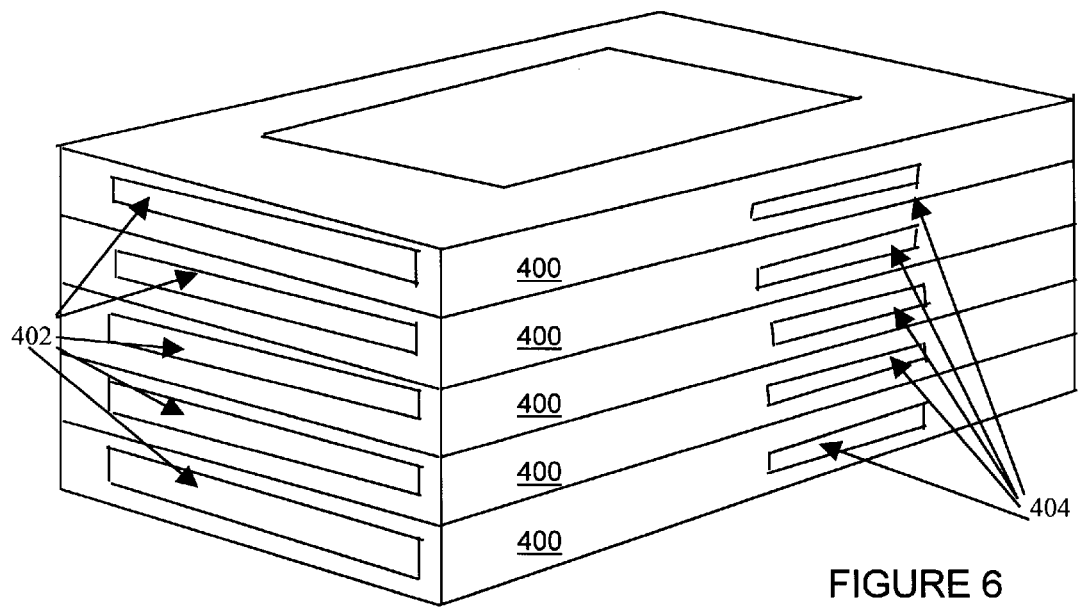
FIG. 6 is a top perspective view of stack of cartons like the one depicted in FIG. 5 useful in an embodiment of the invention.

Given that special needs children will have a number of different life skills to learn, they will all preferably be available in a classroom or other educational setting, and can be retrieved for use on a selected basis. Thus, a stack of the cartons 400 as seen in FIG. 6 can be provided such that their individual labels 402 are visible, and the appropriate carton holding manipulatives contents can be retrieved by the teacher for use as needed.

In addition, the carton 400 may be used by the child to take the apparatus home for further exercises or to demonstrate his or her success to his or her family.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An apparatus to educate special needs children about money comprising:

an easel arranged to display a display page to a child, a graphics card mountable on said display page and having money information visible thereon; and specimen money adapted for mounting on said graphics card and display page in an arrangement correlated with said money information visible on said graphics card;

wherein said display page includes top and bottom edges and said easel includes a frame hinged to said top edge of said display page and a base hinged to said bottom edge, said frame and base having engagement points spaced from their respective hinges to said display page to interlock said frame and base to form said easel into a triangular form to position said display page for display to the child.

2. An apparatus as claimed in claim 2 wherein said engagement points include a bar on said frame and notches on said base, so that said bar can engage a selected one of said notches for selectively setting a vertical angle of display of said display page to the child.

3. An apparatus as claimed in claim 1 wherein said display page has ferromagnetic properties and said graphics card and specimen money have magnetic properties so that said graphics card and specimen money will be supported by magnetic attraction to said display page.

4. An apparatus as claimed in claim 1 wherein said graphics card includes numeric depictions stating values of various ones of said specimen money, so that the child can place corresponding specimen money on said graphics card in association with said numeric depictions to learn to match the appearance of said specimen money with said numeric amount depicted.

5. An apparatus as claimed in claim 1 wherein said graphics card includes depictions of various ones of said specimen money so that the child can place several items of specimen money on said graphics card of lesser value than said depicted money to arrive at the value of said depicted specimen money to learn to equate the value of several items of said lesser value money with said depicted money.

6. An apparatus as claimed in claim 5 wherein said depictions include depictions of a one dollar bill, two quarters, one dime and one nickel.

7. An apparatus as claimed in claim 5 wherein said depictions include numeric depictions stating values of a twenty dollars, ten dollars, and five dollars, so that the child can place specimen money on said graphics card corresponding to said numeric depictions and several items of specimen money of lesser value than said numeric depiction to arrive at the value of said numeric depiction to learn to equate said value of several items of said lesser value money with said depicted money.

8. An apparatus as claimed in claim 1 wherein said graphics card includes a first card with a budget category identifier and a second card for an amount for said budget category, so that the child can place specimen money on said display page corresponding to said amount for said budget category to learn to equate the value of the money placed on the display page with the amount needed for the budget category.

9. An apparatus as claimed in claim 8 wherein said graphics card includes a budget category name card with the budget category identified in letters and a budget category illustration card that shows a non-alphanumeric illustration of the budget category, so that the child can place corresponding first and second cards together on the display page to learn to identify the name of the budget category with the type of benefit obtained by spending money in that category.

10. An apparatus as claimed in claim 9 wherein said budget category is rent and said non-alphanumeric illustration is a picture of a dwelling place.

11. An apparatus as claimed in claim 9 wherein said budget category is groceries and said non-alphanumeric illustration is a picture of a grocery bag.

12. An apparatus as claimed in claim 9 wherein said budget category is medical and said non-alphanumeric illustration is a picture of a pill bottle.

13. An apparatus as claimed in claim 9 wherein said budget category is transportation and said non-alphanumeric illustration is a picture of a bus.

14. An apparatus as claimed in claim 9 wherein said budget category is clothing and said non-alphanumeric illustration is a picture of a jacket.

15. An apparatus as claimed in claim 9 wherein said budget category is utilities and said non-alphanumeric illustration is a picture of a light switch, faucet and thermostat.

16. An apparatus as claimed in claim 8 wherein said second card for an amount is blank and receptive to temporary marking with an amount to be used as a budget amount for an exercise and changeable to a different amount for a different exercise.

17. An apparatus as claimed in claim 1 wherein said specimen money includes simulations of $1.00 bills, $5.00 bills, $10.00 bills, $20.00 bills, $50.00 bills, $100.00 bills, quarters, dimes, nickels, and pennies.

18. The apparatus of claim 1 further comprising a carton for containing the easel, graphics card and specimen money, said carton having a closeable and lockable lid.

19. An apparatus for educating special needs children about money comprising:

an easel having a display page having ferromagnetic properties arranged to display said display page to a child;

specimen money having magnetic properties adapted for mounting on said display page including simulations of $1.00 bills, $5.00 bills, $10.00 bills, $20.00 bills, $50.00 bills, $100.00 bills, quarters, dimes, nickels, and pennies and a plurality of graphics cards having magnetic properties mountable on said display page so that said graphics card and specimen money will be supported by magnetic attraction to said display page, said plurality of graphics cards including a first money card having numeric depictions stating values of money visible thereon so that the child can place corresponding specimen money on said display page in association with said numeric depictions to learn to match said appearance of said specimen money with said numeric amount depicted, a second money card having depictions of various ones of said specimen money so that said child can place several items of specimen money on said graphics card of lesser value than said depicted money to arrive at said value of said depicted specimen money to learn to equate said value of several items of said lesser value money with said depicted money, a third money card having numeric depictions stating values of a twenty dollars, ten dollars, and five dollars, so that said special needs child can place specimen money on said graphics card corresponding to said numeric depictions and several items of specimen money of lesser value than said numeric depiction to arrive at the value of said numeric depiction to learn to equate said value of several items of said lesser value money with said depicted money, budget cards including a first budget card with a budget category identifier and a second card for an amount for said budget category, so that the child can place specimen money on said display page corresponding to said amount for said budget category to learn to equate the value of the money placed on the display page with the amount needed for the budget category.

20. An apparatus as claimed in claim 19 wherein said budget cards include a budget category name card with the budget category identified in letters and a budget category illustration card that shows a non-alphanumeric illustration of the budget category, so that the child can place corresponding first and second cards together on the display page to learn to identify the name of the budget category with the type of benefit obtained by spending money in that category.

21. An apparatus as claimed in claim 20 wherein said budget categories include rent, groceries, medical, transportation, clothing and utilities.

22. The apparatus of claim 1 further comprising a carton for containing the easel, graphics cards and specimen money, said carton sized to contain said easel in a folded condition and the other items, said carton having a closeable and lockable lid.

* * * * *

UNITED STATES PATENT AND TRADEMARK OFFICE
CERTIFICATE OF CORRECTION

PATENT NO.    : 6,224,381 B1  
DATED         : May 1, 2001  
INVENTOR(S)   : Judith L. Culberson, Dean A. Caldwell, and Christie Lockhart It is certified that error appears in the above-identified patent and that said Letters Patent is hereby corrected as shown below:

Column 7, claim 2,
Line 16, delete "claim 2" and replace with -- claim 1 --.

Signed and Sealed this

Twentieth Day of November, 2001

Attest:

NICHOLAS P. GODICI
*Attesting Officer*    *Acting Director of the United States Patent and Trademark Office*